United States Patent Office 2,918,757
Patented Dec. 29, 1959

2,918,757

SEALING GLASS PARTS

Josef Francl and Joseph S. Logiudice, Toledo, Ohio, assignors to Owens-Illinois Glass Company, a corporation of Ohio No Drawing. Application December 21, 1955
Serial No. 554,897

4 Claims. (Cl. 49—82)

The present invention relates to sealing glass-to-glass or glass-to-metal parts into a vacuum-tight seal at relatively low temperatures to avoid thermal damage and thermal stresses in an integrated article formed of such component parts.

The subject invention is particularly advantageous in fabricating vacuum tubes such as cathode-ray tubes for television reception which contain internal element such as color phosphors, shadow masks or grids, all of which are extremely sensitive to elevated temperatures. It is necessary in the fabrication of such tubes that their envelopes of principally glass and metal parts be joined by virtually stress-free or stress-controlled joints. The unstressed joints are required to form permanent hermetic seals able to withstand shock and devitrification.

Accordingly, it is an object of this invention to provide a method and materials for uniting glass-to-glass and glass-to-metal parts at moderate temperatures which are not detrimental to the working components of vacuum tubes.

Another object of this invention is to provide a simple means of sealing vacuum tubes such as cathode-ray tubes with commercially available materials to form durable and virtually stress-free joints.

Another object of this invention is to provide a hermetic seal for vacuum tube envelope parts of varied glass and metal compositions without damage to internal tube components.

Further objects and advantages of this invention will become apparent to those skilled in the art from the following detailed description.

In the manufacture of cathode-ray tubes the glass envelope is commonly formed of three prefabricated parts of glass, namely, the face plate, funnel and neck tubulation. One or more metallic beam guns are normally sealed into the neck opening directed towards the face plate. The glass and metal parts usually have sealing surfaces of matching dimensions which may be sealed by butt joints with solder or brazing glasses of special composition.

It has been found that the individual, preformed glass and metal parts, as for example the above, can be sealed at relatively low temperatures by the use of an adhesion promoting material consisting of antimony metal, antimony oxide, antimony sulfate or antimony sulfide. The preformed glass parts are preheated at their mating edges to temperatures below their strain points to a temperature of approximately 300° C. and preferably either antimony metal or antimony oxide is deposited on the sealing area of the mating surfaces. It is not necessary to reach the temperature given in the literature as the melting points of either the antimony metal or its oxide to obtain its deposition on the sealing surfaces. Similarly antimony sulfate or sulfide may be deposited on glass at lower temperatures than their melting or decomposing temperatures. The antimony metal or oxide, for example, can be applied to the sealing surfaces by any one of numerous methods. One such method is to place the powdered metal or oxide on the sealing surface and raise its temperature by gentle flaming. Another method is to spray either powdered metal or oxide through a flame onto the preheated glass surfaces to be sealed. Another method is to vaporize the metal or oxide and allow its vapor to condense on the surfaces to be sealed. In any of the above methods the individually coated edges can be joined immediately thereafter either by slight additional heating or without any further heating, the only requirement being that the coating be sufficiently softened into an adherent moldable condition.

After coating the surfaces to be sealed, the antimony coating is usually softened into a plastic layer by additional heat after which the two surfaces are lightly pressed together in proper alignment and then slowly cooled. The cooling operation is not especially critical, but best results are obtained when the parts are cooled to near atmospheric temperature over a period of approximately one hour. It is preferable that both surfaces to be joined be similarly coated and the coatings be in approximately the same softened condition prior to their contact to obtain the most satisfactory seal. The sealing layer can be placed in a suitably softened condition on most soda-lime-silica glass compositions at a temperature of approximately 380° C. It is not necessary that the rigid glass parts to be joined be of the same composition. The antimony coating is able to effectively seal glasses and metals of widely varying compositions and thermal expansion characteristics. The fused seal may be made transparent, yellow colored or reflecting depending upon the composition of the joined parts or colorants incorporated into the seal along with the antimony. Actual glass temperature was measured as 386° C. during fabrication of a glass-to-glass seal of a typical soda-lime-silica glass such as employed in television tube parts. This compares with a strain point temperature of 420° C. for the glass being sealed.

The exact composition of the soft, antimonious sealing layer has not been determined but it has been clearly demonstrated that such a layer can be obtained at temperatures around 380° C. with a wide variety of glass compositions. Antimony metal and antimony oxide are both very adherent to the glass and have both been softened on glass below their true melting points. The mechanism of this adhesion is not fully known but it is apparent that antimony oxides diffuse into the glass surfaces and consequently alter its physical and chemical properties which cause the two glass surfaces to adhere without softening.

Antimony metal and oxides possess a considerable number of properties which are highly compatible from the stand point of adhesion to glass or metals. Antimony atoms have a large radius with loosely bonded electrons in their O-shell. The ready formation of antimony into intermetallic compounds is probably responsible for its high reactivity and the high mobility of its combining ions. Antimony metal has a coefficient of expansion which is in good agreement with the expansion of many glasses which have coefficients of expansion in the range of $90-100 \times 10^{-7}$. It has properties of low vapor pressure and low surface tension which are desirable in materials used in vacuum and television tube sealing. Antimony oxide has a coefficient of expansion which is considerably higher than the coefficients of many sealing glasses, but satisfactory seals can be obtained using materials unmatched in thermal expansion characteristics if the thickness of the applied coatings is kept small. Both antimony metal and oxide wet glass surfaces very well in their softened condition and appear to chemically bond therewith. Only an extremely thin layer is necessary between the parts to form a strong and durable bond. The seal may be opened and resealed by heating the seal and separating the parts, but at an increasingly higher temperature each time such a reseal is accomplished Being able to join glass-to-glass and glass-to-metal parts at low temperatures is advantageous in many processes. One example is the joining of glass television tube parts in which a vacuum-tight seal is required, which will stand baking during evacuation. It is also necessary that the seal be made while maintaining control over the tube dimensions. The most outstanding advantage of this invention lies in forming a seal at temperatures below the strain point of the parts since re-annealing is not required and no deformation of internal parts is experienced.

Various modifications may be resorted to within the spirit and scope of the appended claims.

We claim:

1. The method of bonding complemental sealing surfaces of glass parts comprising the steps of adhering an antimonious coating to at least one of the sealing surfaces of the parts, said antimonious coating selected from the group consisting of antimony metal, antimony oxide, antimony sulfate, and antimony sulfide, the said sealing surfaces of the parts and said antimonious coating being at a temperature in the range of from 300° to 420° C. and said coating in thermoplastic condition simultaneously effecting a lowering of the viscosity of the glass sealing surfaces, joining the sealing surfaces of said parts in juxtaposed relation with the said antimonious coating therebetween, and cooling the joined parts.

2. The method of hermetically bonding complemental sealing edges of two preformed hollow glass parts into an electronic tube envelope comprising the steps of preheating at least the annular sealing edges of the parts to a temperature in the range of from 300° to 420° C. and below the strain point temperature of said glass parts, coating at least one of said sealing edges with an antimony containing compound selected from the group consisting of antimony metal, antimony oxide, antimony sulfate, and antimony sulfide, heating the antimony coating to a temperature in the range of from 300° to 420° C. to combine chemically the antimony with said sealing edges effecting a lowering of the viscosity of the sealing edges, contacting the sealing edges in juxtaposed aligned relation while deforming said coating into a continuous annular layer therebetween to bond said parts by molecular diffusion of the antimony into the glass, and cooling the joined parts at a relatively slow rate.

3. The method of bonding complemental annular sealing surfaces of two preformed hollow glass parts into a vacuum-tight electronic tube envelope comprising the steps of preheating the annular sealing edges of the parts to a temperature in the range of from 300° to 420° C., coating both of said sealing edges with an antimony containing compound selected from the group consisting of antimony metal, antimony oxide, antimony sulfate, and antimony sulfide, heating the coated sealing edges and antimony compound to a temperature in the range of from 300° to 420° C. to effect their chemical combination and a lowering of the viscosity of the base glass comprising said sealing edges, aligning the sealing edges in juxtaposed contacting relation while deforming said coating into a continuous annular layer therebetween to bond said parts by molecular diffusion of the antimony into the glass, and cooling the joined parts at a relatively slow rate.

4. The method of sealing two hollow prefabricated glass parts into vacuum-tight relation comprising the steps of preheating the sealing edges of said glass parts to a temperature of approximately 300° C. and below the strain point temperature of said glass parts, coating at least one of said sealing edges with an antimony containing compound in powdered form adapted to supply antimony oxide in vapor form when heated, heating the antimony coating to a temperature in the range of from 300° to 420° C. to effect a chemical combination of the antimony with the glass of the coated edges and to lower simultaneously the viscosity of the glass thereat, contacting the sealing edges of the parts in proper alignment with the antimony containing glass interposed therebetween to secure their bonding by molecular diffusion, and cooling the joined parts at a relatively slow rate over a period of about one hour.

References Cited in the file of this patent

UNITED STATES PATENTS

| 2,163,409 | Pulfrich | June 20, 1939 |
| 2,274,954 | Dykstra et al. | Mar. 3, 1942 |
| 2,671,746 | Brew | Mar. 9, 1954 |
| 2,754,238 | Arenberg | July 10, 1956 |
| 2,771,969 | Brownlow | Nov. 27, 1956 |